United States Patent
Okamoto et al.

[15] 3,694,538
[45] Sept. 26, 1972

[54] METHOD AND APPARATUS FOR COATING WITH PLASTICS

[72] Inventors: Akio Okamoto; Taiko Uno, both of Ami-machi, Japan

[73] Assignee: Mitsubishi Petrochemical Co., Ltd., Tokyo, Japan

[22] Filed: Aug. 17, 1970

[21] Appl. No.: 64,254

[30] Foreign Application Priority Data

Aug. 18, 1969 Japan ...................... 44/64286

[52] U.S. Cl. .................. 264/173, 117/119.2, 118/69, 264/178, 264/209, 264/237, 425/71, 425/114
[51] Int. Cl. ......... B29c 25/00, B29f 3/10, B44d 1/44
[58] Field of Search ........ 264/95, 209, 178, 348, 237, 264/176 R, 173, 174; 18/14 A, 14 S; 117/119.2, 119.4; 118/69; 425/71, 114

[56] References Cited

UNITED STATES PATENTS

| | | | |
|---|---|---|---|
| 2,814,071 | 11/1957 | Allan et al. | 264/95 |
| 2,287,830 | 6/1942 | Postlewaite | 264/174 |
| 3,377,413 | 4/1968 | Jansson et al. | 264/95 |
| 2,433,937 | 1/1948 | Tornberg | 18/14 |
| 2,945,258 | 7/1960 | Houston | 118/69 |
| 3,226,459 | 12/1965 | Tijunelis | 264/95 |

*Primary Examiner*—Robert F. White
*Assistant Examiner*—Jeffery R. Thurlow
*Attorney*—Martin Smolowitz

[57] ABSTRACT

Molten, thermoplastic resin is extruded from an annular die having a central hole through which an elongated article, such as a pipe is moved axially, so as to cost the article with hot resin. The hot resin coating is then precooled by a uniform stream of air issuing from an annular slot in a ring surrounding the coated article. The slot is inclined in the direction of axial movement of the article. The article then enters a similar ring also having a second inclined slot for discharging a uniform stream of cooling water onto the coated article. The direction and force of the stream of air deflects the sprayed stream of water so that it contacts the coated article in a substantial axial direction so that the contact line of the water spray is substantially tangential to the surface of the elongated article. Thereafter, the article enters through a gasketed opening in its side wall, of a tank containing a liquid to effect cooling of the coated article by immersion. The coating is free of defects due to prior deflection of cooling water preventing direct impingement and providing substantially tangential contact zones of the water on the article.

6 Claims, 1 Drawing Figure

PATENTED SEP 26 1972　　　　　　　　　　　3,694,538
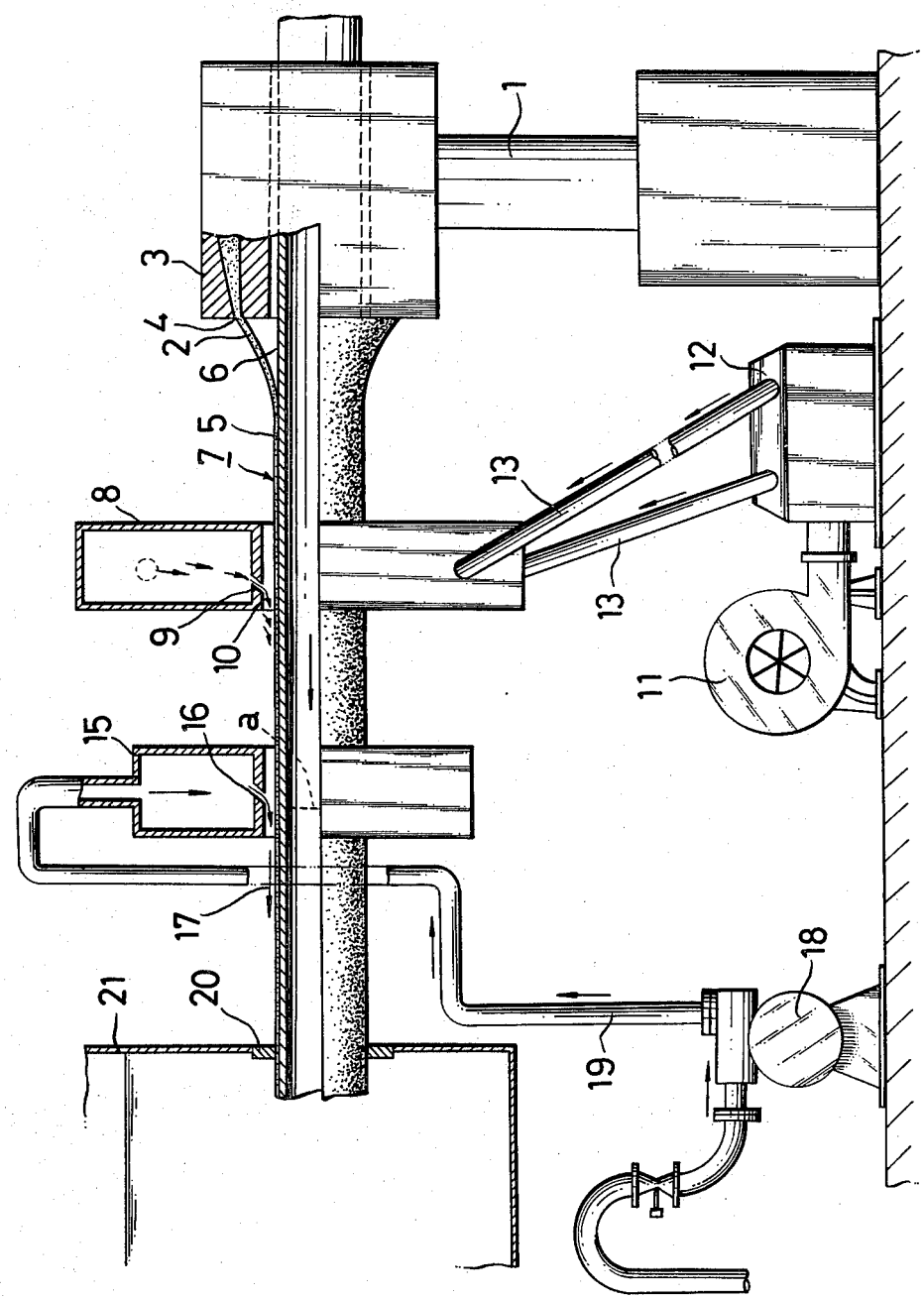
INVENTORS
AKIO OKAMOTO
TAIKO UNO

METHOD AND APPARATUS FOR COATING WITH PLASTICS

This invention relates to coating articles with plastic resins, and more particularly to the continuous cooling of thermoplastic resin a hyphen coated elongated articles.

Heretofore, the cooling of thermoplastic resin extrusion mouldings has been carried out by using air, water (direct and indirect) and the combination thereof. With regard to a cooling method for thin-walled moulding such as a tube or a sheet, various excellent methods have been developed and the present requirements have been almost but not quite satisfied.

However, cooling methods for extruding tubes, bars and other different shapes having a thick-wall and an extrusion coating of plastic resin have until the present invention been imperfect and low in efficiency.

In the past there has been an indirect method of cooling in which a cooling ring, having a cooling plate of the same cross sectional shape as the coated articles with cooling water circulated at the back surface of cooling plate, is allowed to be in contact with the extrusions and moved while maintaining the contact relation to effect an indirect cooling, and thereafter the extrusions are passed through a cooling water bath. Although such cooling method is suitable in the field of products requiring exact size, its cooling ability is low and the moulding velocity is slow.

On the other hand, in a direct cooling method it is usual that either the cooling water be poured on the extrudate as it emerges from the die, or alternatively the extrudate be passed through a cooling water bath, but it is difficult to prevent the leakage of water from the bath at the introducing inlet of the extrudate and, if a sealant such as an elastic body is used, the extrudate suffers from undesirable scratches because the extrudate is still soft. And, if the leakage of the cooling water is splashed on the surface of extrudate, which usually is a highly crystalline fast crystallization velocity resin, the resin is partially cooled and, as a result, partial shrinkage occurs and uneven cooling patches clearly develop on the surface of the product, which greatly reduces the value thereof. If the distance from the die to the cooling water treatment location is extended, and extrudate is first subjected to gradual air cooling to a sufficient extent, and then is immersed in a cooling water, the aforesaid disadvantages may be overcome, but other defects such as low efficiency, drawdown of resin and undesirable growth of crystal, result.

In extrusion thermoplastic resin products, which are produced by melting and mixing thermoplastic resin materials in an extruder, and extruding the molten resin continuously through the nozzle thereof, the products are still low in viscosity, so that they are apt to suffer from changes in shape and surface condition under the influence of the slightest change in the open atmosphere. Therefore, it is necessary that the molten film as it is extruded from the nozzle should be cooled in a moderate and uniform environment without damaging the shape and surface of the products.

It is an object of the present invention to precool the coated articles without destroying the shape of the product under the condition where no blast pressure is exerted on the outer surface of a molten coating by passing a current of cooling air along the surface of coated article whereby the shape thereof is prevented from being deformed by the action of the dynamic pressure of the air, and to carry out sizing at increased viscosity of the outer surface of the coated article under stable conditions.

It is a further object of the invention to provide a water cooling ring for supplying cooling water uniformly onto the extrusion moulding from the circumferential direction into the axial direction and downstream of the cooling air blowing means (i.e. along the direction of the withdrawal of the coated article) to further cool the precooled coated article.

However, should the cooling water flowing to the coated articles through the water cooling ring directly impinge upon the coated film, there occur disadvantages particularly if the contact line of the cooling water with the coated article is not tangential, with respect to the withdrawal direction so that the cooling line falls into disorder, and water drops impinge horizontally and vertically to adhere to the front portion of the cooling water contact line of the coated article thus causing cooling patches of a pitted shape develop.

It is, therefor, a further object of the invention to utilize the cooling air for the purpose of preventing the direct impingement of the cooling water upon the extrudate to present said faults.

That is, in accordance with the present invention the direct impingement of water drops can be prevented by blowing the cooling air under high dynamic pressure from the air blowing ring axially along the coated article behind the stream of the cooling water so that the contact line of the cooling water can be made substantially parallel to the axial feed direction of the coated articles.

The invention provides a novel method for producing coated articles having a smooth surface with high efficiency. Such method comprises precooling the coated articles by blowing air along articles which are obtained by coating the surface of long articles to be coated with molten resins. The articles are then cooled by spraying a cooling water thereon in such a manner that the contact line on the coated article of the cooling water is uniform and straight. The article is finally immersed in a water bath to complete the cooling and solidification.

The invention includes novel apparatus for coating elongated article with thermoplastics including thermoplastic resins such as low density polyethylene, high density polyethylene, polypropylene, polyvinylchloride. These materials are continuously coated on elongated articles such as tubes, bars and the like.

In the drawing,

The single FIGURE is a fragmentary view, partly in section and partly in side elevation, of apparatus illustrative of the invention in extrusion coated pipe by way of example. Referring to the drawing, thermoplastic molten resin 2, molten and milled in an extruder (not shown), is continuously extruded into the form of a tube in the atmosphere through an annular nozzle 4 of an annular die 3 on column 2 at a velocity of 7 to 20 m/min, while a steel pipe 5 moves through the center bore or hole H of the die 3 in the same direction as that of the extrusion of the molten resin 2 and thus is coated by said molten resin 2 near the head of the die 3. In this case it is preferred that the pressure in annular space 6 enclosed by molten resin 2 the steel pipe 5 and the die 3 be reduced in order to ensure that the operation of coating the steel pipe 5 with the molten resin is smoothly and compactly effected.

The extrusion coated composite 7 thus produced is passed through a ring 8 blowing cooling air 10 disposed in contact with or at a distance up to about 100 cm from the die 3 and precooled by the smooth stream cooling air 10 blown from an annular slot nozzle 9 of the blowing ring 8. In the cooling air blowing ring 8 the cooling air is supplied in the circumferential direction from a blower 11 through a manifold or buffer tank 12 and pipes 13 for equalizing air flow volume and pressure.

The nozzle or slot 9 from which the cooling air is blown is conical in shape and is directed or inclined toward the feed direction of the composition 7 at an included angle of 0 to 30° with respect to the axis of movement of the composite 7. The cooling air 10 blown from the nozzle 9 has a dynamic pressure of 100 to 600 mm $H_2O$ (water column) a velocity of 15 to 50 m/sec, and the cooling air 10 travels along the composite 7 parallel to the feed direction. Therefore, no negative pressure due to the cooling air 10 occurs on the surface of the extrusion moulding composite 7 which would result in the deformation of the shape thereof.

The extrusion coated composite 7, thus precooled by air, is passed through a water cooling ring 15 fixed in contact with or at a distance within 100 cm from the cooling air blowing ring 8 to further cool, by cooling water 17, flowing from an annular slot or nozzle 16 of the water cooling ring 15. In order to spray the required amount of the cooling water, at the predetermined pressure into the water cooling ring 15, the cooling water is supplied through pump 18, and a pipe 19. The nozzle 16 from which the cooling water is discharged, is conical in shape and is also directed along the axial feed direction of the composite 7 at an angle of 30° to 60°.

Therefore, the cooling water 16 from the water cooling ring 15 is blown by the cooling air 10 from ring 8 toward the surface of the composite 7 at an angle of 30° to 60°, and on the other hand, since said cooling air 10 is blown on the stream of the cooling water 16, the cooling water 16 is prevented from irregular impingement upon composite 7.

As a result the surface of composite 7 has a uniform appearance.

In order to further increase the cooling effect, the extrusion coated composite 7 moves into a liquid cooling bath 21 passing through a side wall opening having an annular packing 20 in tank T. In such immersion the article is completely cooled. A water bath is preferred Also, with products which require exactness in product size, it is possible to use the present invention in combination with such instruments such as sizing dies. But, in such case the length between the air and water rings 8, 15 may be shorter than that hitherto used.

When other type mouldings are to be coated of cross section that is a rectangle, ellipse, or rhomb, it is not necessary that the shape of the air cooling ring 8 and the water cooling ring 15 exactly conform to such shapes. The opening may be allowed to align with that of the mouldings to be coated, and the circular opening having a diameter in the range of the dimension substantially, equal to the largest dimension to up to + 100 mm may be used as substitutes. In the preferred embodiment the distance between the die and the cooling air blowing ring is 0 to 30 cm, and the distance between the cooling air blowing ring and the water cooling ring is 10 to 20 cm and further the distance between the water cooling ring and the water bath is 30 to 50 cm.

EXAMPLE

With respect to the coating of S.G.P. steel pipe 3 inches in the outside diameter with polypropylene (Melt Index = 10), the following experimental results were obtained as shown in Table 1. In the case of A, which corresponds to the method of the present invention, coating is effected by using the apparatus shown in the drawing wherein the distance between the die and the cooling air blowing ring, the distance between the cooling air blowing ring and the water cooling ring and the distance between the water cooling ring and the bath are respectively determined at 25 cm, 15 cm and 40 cm. In the case of B, coating is effected by using the apparatus shown in the drawing and the distance between the air blowing ring and the water bath is 1.5m. And in the case of C, coating is effected by using the apparatus wherein the water cooling ring is removed from the apparatus shown in the drawing and the distance between the air blowing ring and the water bath is 2.5m.

TABLE 1

| | Moulding Velocity | Film Shrinkage Rate | Product Appearance |
| --- | --- | --- | --- |
| A (the present method) | 10 m/min | median | good |
| B (comparison method) | 10 | large | bad |
| C (comparison method) | 4 | small | good |

The term "film shrinkage rate" is intended to signify the shrinkage amount of the film of the coated steel pipe after coating and cooling have been carried out and the coated steel pipe has been cut into a length of 5m. "Small" is 10 mm in shrinkage amounts and practically preferable, "median" is 10 to 20 mm in shrinkage amount and practicable, and "large" is 20 mm shrinkage amount and impracticable.

The term "product appearance" is intended to signify the uniformity of the coated film observed from appearance, and "good" represents that the film as a whole is smooth, and "bad" represents that the unevenness owing to the unequal shrinkage of the coated resin is present.

In addition, the conditions under which said experiments have been carried out are as follows;

(1) Materials used
    Polypropyelen (ML = 1.0)
    Steel pipe     the outside diameter = 3 inches
(2) Instruments used
    Extruder     (90 mm $\phi$
    Die caliber     95 mm $\phi$
(3) Operation conditions
    Resin extruding temperature     240°C
    Cooling

| | |
|---|---|
| Cooling water temperature | 18°C |
| Cooling air | 25°C |

The invention not only eliminates the problems and troubles of the prior art, but provides an excellent method for cooling thermoplastic coated articles, leaving them unspoiled and in perfect condition.

What is claimed is:

1. Apparatus for coating elongated articles with thermoplastic resins which comprises means for extruding molten plastics onto the surface of said articles to be coated, to form a coating thereon, means for moving said coated articles in the direction of their major axis, air blowing means for blowing cooling air along and substantially parallel to the surface of the moving coated articles, a water cooling spray means for spraying cooling water on the coated articles closely adjacent said air blowing means so that water passing from said spray means is deflected by the air from said blowing means in a direction substantially parallel to said moving articles, and a water cooling bath for immersing the coated articles.

2. Apparatus according to claim 1 wherein, said cooling air blowing means is a ring with an annular nozzle directed along the axis of movement of the coated articles at an angle of 0 to 30° thereto and is conical in shape.

3. Apparatus according to claim 1 wherein, said water cooling means is a ring that has an annular nozzle directed in the axis of movement of the coated articles at an angle of 30° to 60° thereto, and is also conical in shape.

4. The method for coating elongated articles with thermoplastic resins which comprises coating the outer surface of said articles with molten thermoplastic resin and solidifying the resin coat by cooling with cooling air from a cooling air blowing ring blown along the surface of the coated articles to pre-cool the same, and then with cooling water from a water cooling ring said air being blown along the surface of the article toward the cooling water so that the cooling water is prevented from directly impinging on the coated articles, and the contact line of the cooling water on the coated articles is thereby maintained substantially tangent with respect to the surface of the elongated coated articles along its major axis and subsequently introducing said articles into a bath of cooling water.

5. Method of coating an elongated article with thermoplastic resin according to claim 4, which comprises, extruding molten resin through an annular die surrounding the article to form a coating thereon, moving the coated article axially in the direction of its length through a hole in the axial center of the die, while such resin is so extruded, to coat the article, blowing cool air, from an annular slot in a first ring surrounding such coating, in a direction substantially parallel to the direction of movement onto the moving surface of the resulting coating on the moving article, said slot being inclined in the direction of movement of said coated article and then spraying cooling water from a second annular slot in a second ring surrounding said coated article positioned downstream with respect to said first ring, such second slot being also inclined in the direction of movement of the coating whereby the air blown from said first ring deflects the water from said second ring in a direction tangential to said coating moving surface to prevent direct impingement of said water upon said coated surface and subsequently introducing said article into a bath of cooling water.

6. The invention as defined by claim 5, in which the coated article is subsequently introduced into a bath of cooling water by moving same through a gasket-sealed opening in the side wall of a cooling water tank.

* * * * *